US012752319B2

(12) United States Patent
Li

(10) Patent No.: US 12,752,319 B2
(45) Date of Patent: Oct. 6, 2026

(54) BRICK FABRICATED FROM WASTE FRP

(71) Applicant: National Taipei University of Technology, Taipei (TW)

(72) Inventor: Yeou-Fong Li, Taipei (TW)

(73) Assignee: National Taipei University of Technology, Taipei (TW)

( * ) Notice: Subject to any disclaimer, the term of this patent is extended or adjusted under 35 U.S.C. 154(b) by 736 days.

(21) Appl. No.: 18/310,252

(22) Filed: May 1, 2023

(65) Prior Publication Data

US 2023/0372984 A1 Nov. 23, 2023

(30) Foreign Application Priority Data

May 20, 2022 (TW) .................................. 111143404

(51) Int. Cl.
*B09B 3/25* (2022.01)
*B09B 101/50* (2022.01)
(Continued)

(52) U.S. Cl.
CPC ............ *B09B 3/25* (2022.01); *B09B 2101/50* (2022.01); *B09B 2101/55* (2022.01); *B09B 2101/75* (2022.01)

(58) Field of Classification Search
CPC ... B09B 3/25; B09B 2101/50; B09B 2101/55; B09B 2101/75; Y02W 30/91
See application file for complete search history.

(56) References Cited

U.S. PATENT DOCUMENTS

2004/0250736 A1* 12/2004 Hemmings ............. C04B 14/22 106/716
2011/0306255 A1* 12/2011 Rathenow ............... C04B 28/26 442/164
(Continued)

FOREIGN PATENT DOCUMENTS

CN 105293964 A * 2/2016
CN 105293964 B * 7/2017
(Continued)

OTHER PUBLICATIONS

Physical mechanical and thermal behavior of concrete block stabilized with glass fiber reinforced polymer waste published Nov. 14, 2020 Jaqueline Damiany Portela Romulo Marcal Gandia Barbara Iemes Outeiro Araujo Rodrigo Alllen Pereira and Francisco Carlos Gomes (Year: 2020).*

(Continued)

*Primary Examiner* — Pamela H Weiss
(74) *Attorney, Agent, or Firm* — MUNCY, GEISSLER, OLDS & LOWE, P.C.

(57) ABSTRACT

A brick fabricated from a waste fiber-reinforced polymer (FRP) includes a main body. The main body is formed of a composite. The composition of the composite includes, in parts by weight, 1.0 part by weight of a plurality of furnace slag powders, 0.35 to 0.5 parts by weight of a plurality of glass fiber/polymer particles, 0.02 to 0.5 parts by weight of a plurality of glass powders, and 0.65 to 0.75 parts by weight of an alkali solution. The glass fibers/polymer particles are obtained by crushing the waste FRP. The glass powders are obtained by crushing a waste glass. The furnace slag powders, the glass fiber/polymer particles, the glass powders and the alkali solution are uniformly mixed into a mixture. The mixture is poured into a mold, and then generates a polymerization reaction to form the main body.

6 Claims, 5 Drawing Sheets

(51) Int. Cl.
*B09B 101/55* (2022.01)
*B09B 101/75* (2022.01)

(56) References Cited

U.S. PATENT DOCUMENTS

| | | | | | |
|---|---|---|---|---|---|
| 2014/0047999 | A1 * | 2/2014 | Razl | C04B 28/021 | |
| | | | | 106/676 | |
| 2014/0264140 | A1 * | 9/2014 | Gong | C04B 28/006 | |
| | | | | 106/676 | |
| 2018/0009926 | A1 * | 1/2018 | Kuroki | C09D 201/02 | |

FOREIGN PATENT DOCUMENTS

| | | | | | |
|---|---|---|---|---|---|
| CN | 109851269 | A | * | 6/2019 | |
| CN | 110937876 | A | * | 3/2020 | C04B 18/248 |
| JP | 07089012 | A | * | 4/1995 | |
| KR | 101941179 | B1 | * | 1/2019 | C04B 41/459 |
| WO | WO-2015149176 | A1 | * | 10/2015 | C04B 12/005 |

OTHER PUBLICATIONS

Utilization of fiber reinforced plastic waste generated by wind turbine manufacturing componay by N Ramesh Tasneem Abbasi S M Tauseefand S A Abbasi International Journal of Engineering and Scientific Research vol. 6 Issue Feb. 2, 2018 (Year: 2018).*

Investigation on the glass fiber reinforced geopolymer concrete made of M Sand by Ganesh A Chihambar and M Muthukannan Journal of Materials and Engineering Structures 6 (2019) 501-512 (Year: 2019).*

Development of FRC materials with Recycled Glass Fibers recovered from GFRP Acrylic Waste Patel gupta Garg Wang Dave Advances in materials Science and Engineering vol. 2019 Article ID 4149708 15 pages (Year: 2019).*

Machine Translation CN 110937876A (Year: 2020).*

JP 07089012A Machine Translation (Year: 1995).*

Assessment of glass fiber reinforced polymer waste reuse as filler in mortar by Catrina Farinha Jorge Brito Rosario Veiga Journal of Cleaner Production 201 (2019) 1579-1594 (Year: 2019).*

Durability of the Reinforced One aprt Alkali activated Slag mortars with Different Fibers Z Abdollahnejad M mastali M Falah K Shaad Luukonen M Illkainen Waste and Biomass Valorizatoin (2021) 12:487-501 (Year: 2021).*

Li et al., *Geopolymer Solidifies Waste Printed Circuit Board Powder to Make Mortar Block for Grass Growing—An Application of Circular Economy*, May 2022, 10 pages, Industrial Materials Journal No. 425, National Taipei University of Technology, Taiwan.

* cited by examiner

BRICK FABRICATED FROM WASTE FRP

CROSS-REFERENCE TO RELATED APPLICATION

This utility application claims priority to Taiwan Application Serial Number 111143404, filed May 20, 2022, which is incorporated herein by reference.

BACKGROUND OF THE INVENTION

1. Field of the Invention

The invention relates to a brick fabricated from a waste fiber-reinforced polymer (FRP), to a brick, fabricated from a waste FRP, capable of meeting commercial specifications for strength and being fire resistant.

2. Description of the Prior Art

In general, FRP is a composite material combined with glass fibers and a resin. Regarding the characteristics of FRP material, the FRP material is lightweight, hard, non-conductive, and corrosion-resistant. Moreover, the FRP material is a material widely used in countries all over the world. FRP products cover bathtubs, cooling towers, yachts, building materials, printed circuit boards, home appliances, auto parts, aerospace components. The applications of the FRP material can be seen in the general livelihood and even aerospace fields.

Polymers in FRP materials are all made of thermosetting resins. Taking printed circuit boards as an example, most of printed circuit boards use thermosetting resins such as epoxy resins, phenolic resins and so on. Some polymers in industrial FRP materials use thermosetting resins such as unsaturated polyester resins (UP) and so on. Thermosetting resins themselves have the characteristic that the thermosetting resins cannot return to their original appearances after hardening. Due to chemical and thermal stabilities of thermosetting resins, thermosetting resins are not easy to be recycled, and it takes a lot of cost and time to recycle thermosetting resins.

Regarding the recycling of waste FRP product, after the domestic manufacturers recycle precious metals from waste printed circuit boards, due to technical and cost considerations, most of the waste resins and glass fibers are processed by crushing and remanufacturing, incineration, and landfill to result in that the resource reuse rate of waste printed circuit boards is less than 30%. The recycling of other waste FRP products is also mostly handled by incineration and landfill. At present, it has not been able to effectively recycle the waste of FRP products for reuse. In addition, many countries are currently facing the dilemma of land constraints or shortage of incinerators that cannot handle waste FRP products. However, the polymers in FRP product waste cannot be recycled after cross-linking and hardening, and the polymers will cause toxic waste gas after incineration, which is a big problem.

Many countries produce a lot of waste FRP products every year, so assisting in the disposal of waste FRP products has become a top priority in these countries. In recent years, the global economy has developed rapidly, and the earth's resources are rapidly consumed. Therefore, how to effectively and sustainably utilize resources and develop has become an international consensus. Therefore, effective waste FRP product recycling technology is an important part of the future circular economy. The impact on the environment and the economic benefits of effective waste FRP product recycling technology cannot be underestimated.

Inorganic polymers are also called geopolymers. Inorganic polymers are high molecular substances composed of non-carbon atoms. The atoms of the inorganic polymers are bonded by covalent bonds. In essence, the inorganic polymers are mixtures of mineral compounds or compounds composed of repeating units, for example, silicon dioxide ($SiO_2$), aluminosilicate minerals (Zeosorb), aluminosilicates (—Fe—O—Si—O—Al—O—) or aluminophosphates (—Al—O—P—O—) etc. The structure of the inorganic polymer is similar to that of a zeolite. The hardening mechanism of inorganic polymers is similar to that of a cement, which is an inorganic polymerization between the particles of the system colloid. The hardening time of the inorganic polymer at room temperature is about 1.5-2 hours, and the compressive strength of the inorganic polymer is more than 80% after hardening for four hours. The biggest difference between inorganic polymer and cement is that the bonding form of cement is hydration bonding after hardening, while the bonding form of inorganic polymer is chemical bonding. Because the inorganic polymer is a three-dimensional frame structure formed by the ionic bonding of silicon aluminum oxide, which has extremely high stability to heat. Due to the degree of inorganic polymerization and the different type of metal cations that maintain electrical neutrality, so for there will also be slight differences in the resistance of the inorganic polymer to flames.

Although inorganic polymers have many advantages, they still have some disadvantages, such as expensive price, surface blooming, rapid condensation, and so on. The price is a big test that must be faced in the application of inorganic polymers. Since inorganic polymers use a large amount of NaOH (or KOH) and sodium silicate solutions, and most of the inorganic polymers use metakaolin as raw material. Metakaolin is made from kaolinite calcined at 600~800° C. Therefore, the price of metakaolin is high so that it is difficult for metakaolinto to compete with cheap cement. Therefore, the solution to replace metakaolin can use industrial waste as the main raw material of inorganic polymer, for example, blast furnace slag, coal-fired fly ash, etc.

Furnace slag powders are a waste from steelmaking and other industries. The main chemical components of furnace slag powders include $SiO_2$, $Al_2O_3$, CaO, and MgO. The compositional ratio of furnace slag powders is similar to that of cement, and the furnace slag powder is also an inorganic polymer. According to the data released by CHC Resources Corp., Compared the $CO_2$ emission per ton of cement production with that of furnace slag powder production, the $CO_2$ emission of the former is only about 1/17 of the latter. Therefore, using furnace slag powder, the benefits of carbon reduction are significantly higher.

At present, no technology has been proposed to integrate the recycling of waste FRP product and furnace slag powders into reprocessed products.

SUMMARY OF THE INVENTION

Accordingly, one scope of the invention is to provide a brick fabricated from a waste FRP. The composite used to make the brick according to the invention also include industrial waste of furnace slag powders or cement. Moreover, the brick according to the invention is capable of meeting commercial specifications for strength and being fire resistant.

A brick, fabricated from a waste FRP, according to a preferred embodiment includes a main body. The main body is formed of a composite. The composition of the composite, in parts by weight, includes 1.0 part by weight of a plurality of furnace slag powders, 0.35 to 0.5 parts by weight of a plurality of glass fiber/polymer particles, 0.02 to 0.5 parts by weight of a plurality of glass powders, and 0.65 to 0.75 parts by weight of an alkali solution. The glass fibers/polymer particles are obtained by crushing the waste FRP. The glass powders are obtained by crushing a waste glass. A concentration of the alkali solution ranges from 3.0M to 12M. The furnace slag powders, the glass fiber/polymer particles, the glass powders and the alkali solution are uniformly mixed into a mixture. The mixture is poured into a mold, and then generates a polymerization reaction to form the main body.

In one embodiment, the main body of the brick according to the invention has an average compressive strength equal to or larger than 40.0 MPa at 7 days of age.

In one embodiment, the plurality of glass fiber/polymer particles can include glass short fibers, and also include an epoxy resin, a phenolic resin or an unsaturated polyester resin.

Further, the brick according to the preferred embodiment of the invention also includes a pattern layer. The pattern layer is formed on a top surface of the main body by a transferring process.

A brick, fabricated from a waste FRP, according to another preferred embodiment includes a main body. The main body is formed of a composite. The composition of the composite, in parts by weight, includes 1.0 part by weight of a plurality of cement and 0.35 to 0.5 parts by weight of a plurality of glass fiber/polymer particles. The glass fibers/polymer particles are obtained by crushing the waste FRP. The cement and the glass fiber/polymer particles are uniformly mixed into a mixture with a water-cement ratio. The mixture is poured into a mold, and then generates a solidification and hardening reaction to form the main body of the brick according to the invention. The water-cement ratio is equal to or less than 0.6.

Compared to the prior art, the brick according to the invention is recycled and integrated with the waste FRP and the furnace slag powders or integrated with the cement to form the remade brick. Moreover, the brick according to the invention is capable of meeting commercial specifications for strength and being fire resistant.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 1:
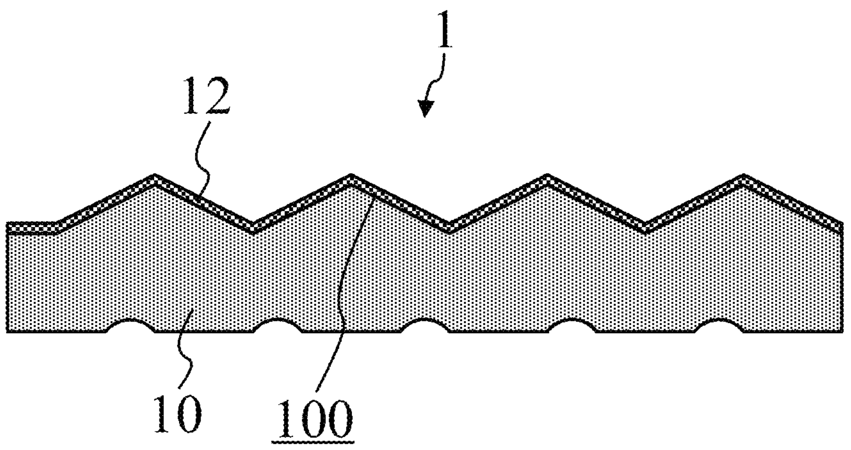
FIG. 1 is a cross-sectional view of a brick fabricated from a waste FRP according to the preferred embodiment of the invention.
Figure 2:
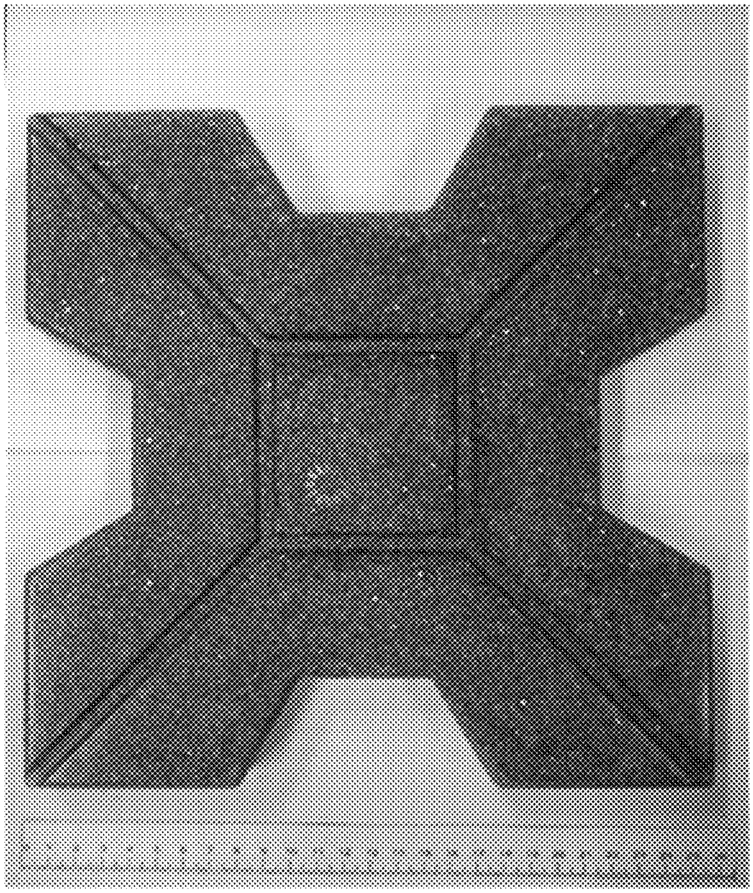
FIG. 2 is a photograph of the appearance of one example of the brick of the invention as the example of grass planting brick.

Referring to FIG. 1, FIG. 1 is a cross-sectional view of a brick 1 fabricated from a waste FRP according to the preferred embodiment of the invention.

As shown in FIG. 1, the brick 1, fabricated from the waste FRP, according to the preferred embodiment includes a main body 10. The main body 10 is formed of a composite.

The composition of the composite, in parts by weight, includes 1.0 part by weight of a plurality of furnace slag powders, 0.35 to 0.5 parts by weight of a plurality of glass fiber/polymer particles, 0.02 to 0.5 parts by weight of a plurality of glass powders, and 0.65 to 0.75 parts by weight of an alkali solution. The glass powders are obtained by crushing a waste glass.

The glass fibers/polymer particles are obtained by crushing the waste FRP. Taking printed circuit boards as an example, manufacturers generally use an insulating prepreg material composed of non-woven fabrics made from glass fibers and an epoxy resin, and then press it with copper foil to form a copper foil substrate for use. The rough composition of printed circuit boards includes 28 wt. % of resin, 42 wt. % of glass fiber and 30 wt. % of metal. According to the invention, if the waste of fiber-reinforced polymer products is a printed circuit board, the printed circuit board will be crushed first to recover valuable metals, and the remaining residue will be used as the raw material for the main body 10 of the brick 1 according to the invention—a plurality of glass fiber/polymer particles. It should be noted that the proportions of glass fiber and polymer in different waste FRP products are different, but the plurality of glass fibers/polymer particles obtained by crushing different waste FRP products can be used as raw materials for the main body 10 of the brick 1 according to the invention.

A concentration of the alkali solution ranges from 3.0M to 12M. In one embodiment, the alkali solution can be NaOH, KOH, or other alkali solution.

The furnace slag powders, the glass fiber/polymer particles, the glass powders and the alkali solution are uniformly mixed into a mixture. The mixture is poured into a mold, and then generates a polymerization reaction to form the main body 10 of the brick 1 according to the invention.

In practical applications, the brick 1 according to the invention can be used as a grass planting brick, a wall brick, a floor brick, an interlocking brick, or other common brick on the market.

In one embodiment, the main body 10 of the brick 1 according to the invention has an average compressive strength equal to or larger than 40.0 MPa at 7 days of age.

In one embodiment, the plurality of glass fiber/polymer particles can include an epoxy resin, a phenolic resin or an unsaturated polyester resin.

Also as shown in FIG. 1, a brick 1, fabricated from a waste FRP, according to another preferred embodiment includes a main body 10. The main body 10 is formed of a composite.

Different from the preferred embodiment aforesaid, in another preferred embodiment of the invention, the composition of the composite, in parts by weight, includes 1.0 part by weight of a plurality of cement and 0.35 to 0.5 parts by weight of a plurality of glass fiber/polymer particles. Similarly, the glass fibers/polymer particles are obtained by crushing the waste FRP. The cement and the glass fiber/polymer particles are uniformly mixed into a mixture with a water-cement ratio. The mixture is poured into a mold, and then generates a solidification and hardening reaction to form the main body 10 of the brick 1 according to the invention. The water-cement ratio is equal to or less than 0.6.

Also as shown in FIG. 1, further, the brick 1 according to the preferred embodiment of the invention also includes a pattern layer 12. The pattern layer 12 is formed on a top surface 100 of the main body 10 by a transferring process. In one embodiment, the pattern layer 12 includes an inorganic pigment and a glaze base. The glaze base is sintered to form a glazed layer, and the sintering temperature of the glaze base is lower than the ignition point of the polymer in the plurality of glass fibers/polymer particles. The pattern layer 12 with the glazing layer has high Mohs hardness, and is fire resistant.

Figure 3:
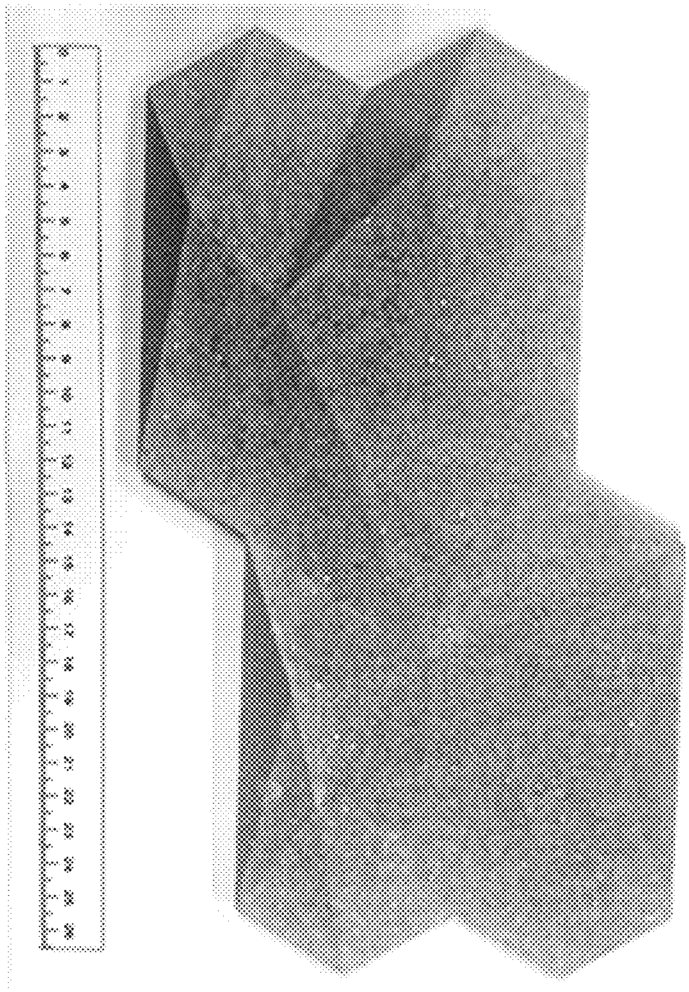
FIG. 3 is a photograph of the appearance of one example of the brick of the invention as a wall brick without a pattern layer.
Figure 4:
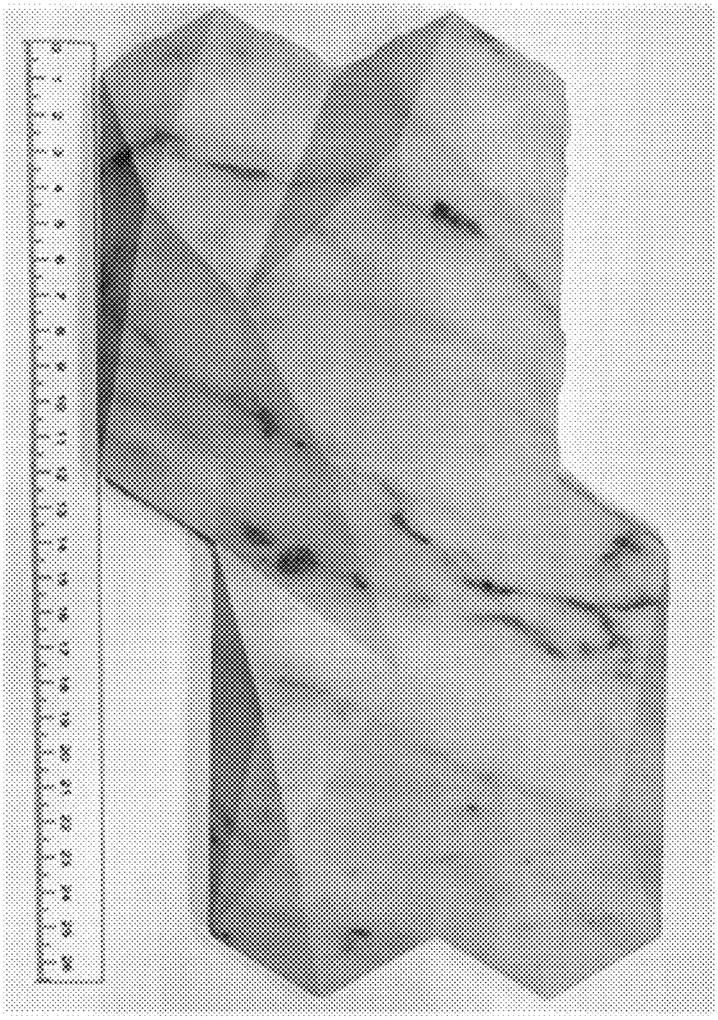
FIG. 4 is a photograph of the appearance of one example of the brick according of the invention as a wall brick having a pattern layer presenting a quasi-marble pattern.
Figure 5:
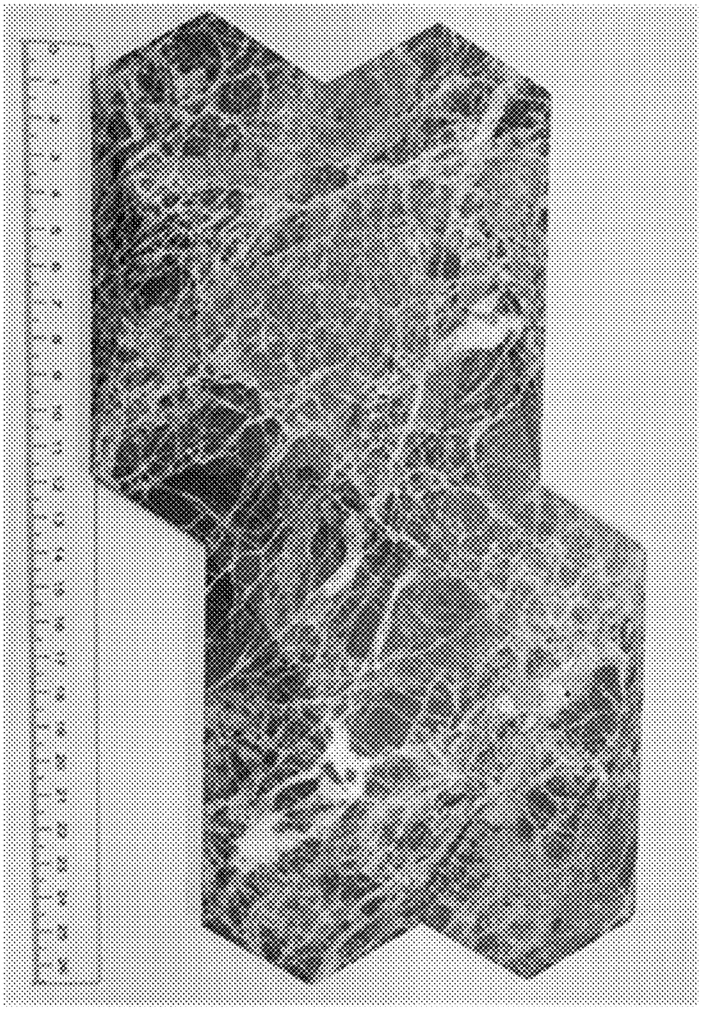
FIG. 5 is an appearance photograph of one example of the brick according of the invention as a wall brick having a pattern layer presenting a pseudo-granite pattern.

Referring to FIG. 2 to FIG. 5, FIG. 2 is a photograph of the appearance of one example of the brick 1 of the invention as the example of grass planting brick. FIG. 3 is a photograph of the appearance of one example of the brick 1 of the invention as a wall brick without a pattern layer 12. FIG. 4 is a photograph of the appearance of one example of the brick 1 according of the invention as a wall brick having a pattern layer 12 presenting a quasi-marble pattern. FIG. 5 is an appearance photograph of one example of the brick 1 according of the invention as a wall brick having a pattern layer 12 presenting a pseudo-granite pattern. Obviously, the brick 1 according to the invention can replace bricks made of natural stone.

The composite used to manufacture the main body of the brick according to the invention is poured in different compositional proportions into several test bodies with a diameter of 100 mm×a height of 200 mm in accordance with the CNS 1230 test standard. These test bodies are subjected to a compressive strength test.

These test bodies made of different compositional proportions of composites are all based on 1.0 part by weight of a plurality of furnace slag powders, are fixedly added with 0.7 parts by weight of an alkali solution and 0.03 parts by weight of a plurality of glass powders, and there are three added glass fiber/polymer particle ratios: 0.35 parts by weight, 0.4 parts by weight, and 0.5 parts by weight. The weight of the furnace slag powders, the weight of the glass fiber/polymer particles, and the concentration of the alkali solution of the above-mentioned test bodies are listed in Table 1. The above-mentioned test bodies at the age of 7 days are taken to carry out the compressive strength test, and the average compressive strengths of these test bodies obtained by the compressive strength test are also listed in Table 1. In contrast, other test bodies are respectively made of the weight of furnace slag powder: the weight of glass fiber/polymer particle as 1:1, and the weight of furnace slag powder: the weight of glass fiber/polymer particle: the weight of metakaolin as 1:0.85:0.5, and the average compressive strengths of these test bodies are also listed in Table 1.

The test results listed in Table 1 confirm that in contrast, the average compressive strengths of the test bodies, respectively made of the weight of furnace slag powder: the weight of glass fiber/polymer particle as 1:1, and the weight of furnace slag powder: the weight of glass fiber/polymer particle: the weight of metakaolin as 1:0.85:0.5, both are lower than 25 MPa.

The average compressive strengths of the test bodies made of different compositional proportions of composites capable of fabricating the main body of the brick according to the invention all are higher than 40.0 MPa.

It should be emphasized that according to the compressive strength specified in the floor tile standard CNS13295, the compressive strength of Class A floor brick is higher than 32 MPa. Obviously, the average compressive strengths of the test bodies made of different compositional proportions of composites capable of fabricating the main body of the brick according to the invention all exceeds the compressive strength of Class A floor brick specified in the floor tile standard CNS13295.

TABLE 1

| weight of the furnace slag powders:weight of the glass fiber/polymer particles | concentration of alkali solution | average compressive strength (MPa) |
|---|---|---|
| 1:0.35 | 4M | 53.64 |
| 1:0.4 | 4M | 50.41 |
| 1:0.5 | 4M | 47.61 |
| 1:0.35 | 6M | 56.53 |
| 1:0.4 | 6M | 55.74 |
| 1:0.5 | 6M | 53.27 |
| 1:1 | 6M | 15.82 |
| 1:0.85:0.5 (metakaolin) | 6M | 23.80 |

Even, the brick according to the invention can replace the brick made of natural stone.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A brick fabricated from a waste fiber-reinforced polymer (FRP), comprising:

a main body, formed of a composite, the composite, in parts by weight, comprising:

1.0 part by weight of a plurality of furnace slag powders, 0.35 to 0.5 parts by weight of a plurality of glass fiber/polymer particles, wherein the glass fibers/polymer particles are obtained by crushing the waste FRP, 0.02 to 0.5 parts by weight of a plurality of glass powders, wherein the glass powders are obtained by crushing a waste glass, and 0.65 to 0.75 parts by weight of an alkali solution, wherein a concentration of the alkali solution ranges from 3.0M to 12M, the furnace slag powders, the glass fiber/polymer particles, the glass powders and the alkali solution are uniformly mixed into a mixture, the mixture is poured into a mold, and then generates a polymerization reaction to form the main body.

2. The brick of claim 1, wherein the main body has an average compressive strength equal to or larger than 40.0 MPa at 7 days of age.

3. The brick of claim 2, wherein the plurality of glass fiber/polymer particles comprise one selected from the group consisting of an epoxy resin, a phenolic resin and an unsaturated polyester resin.

4. The brick of claim 3, further comprising:

a pattern layer, formed on a top surface of the main body by a transferring process.

5. A brick fabricated from a waste fiber-reinforced polymer (FRP), comprising:

a main body, formed of a composite, the composite, in parts by weight, comprising:

1.0 part by weight of a plurality of cement, and 0.35 to 0.5 parts by weight of a plurality of glass fiber/polymer particles, wherein the glass fibers/polymer particles are obtained by crushing the waste FRP, the cement and the glass fiber/polymer particles are uniformly mixed into a mixture with a water-cement ratio, the mixture is poured into a mold, and then generates a solidification and hardening reaction to form the main body, the water-cement ratio is equal to or less than 0.6.

6. The brick of claim 5, further comprising:

a pattern layer, formed on a top surface of the main body by a transferring process.

* * * * *